US009625937B2

(12) United States Patent
Bischoff et al.

(10) Patent No.: US 9,625,937 B2
(45) Date of Patent: Apr. 18, 2017

(54) COMPUTATION EFFICIENCY BY DIFFRACTION ORDER TRUNCATION

(75) Inventors: Joerg Bischoff, Ilmenau (DE); Shifang Li, Pleasanton, CA (US); Weidong Yang, Milpitas, CA (US); Hanyou Chu, Palo Alto, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 1570 days.

(21) Appl. No.: 12/193,341

(22) Filed: Aug. 18, 2008

(65) Prior Publication Data

US 2010/0042388 A1 Feb. 18, 2010

(51) Int. Cl.
*G06F 7/60* (2006.01)
*G06G 7/48* (2006.01)
*G06E 1/00* (2006.01)

(52) U.S. Cl.
CPC .................................... *G06E 1/00* (2013.01)

(58) Field of Classification Search
CPC ........................................................ G06E 1/00
USPC ......................................................... 703/2, 6
See application file for complete search history.

(56) References Cited

U.S. PATENT DOCUMENTS 6,137,570 A * 10/2000 Chuang .............. G01N 21/9501 250/559.04
6,891,626 B2 * 5/2005 Niu et al. ...................... 356/625
6,898,537 B1 5/2005 McGahan
7,171,284 B2 * 1/2007 Vuong ................ G03F 7/70625 438/16
7,428,060 B2 * 9/2008 Jin ......................... G01B 11/24 356/445
7,588,949 B2 * 9/2009 Vuong ................ G03F 7/70625 257/E21.53
7,990,549 B2 * 8/2011 Walsh ........................... 356/612
2004/0267397 A1 12/2004 Doddi
2006/0176493 A1 * 8/2006 Larsen et al. ................. 356/625
2007/0223011 A1 9/2007 Jin et al.
2008/0129986 A1 * 6/2008 Walsh ........................... 356/138

OTHER PUBLICATIONS

Benfeng Bai and Lifeng Li, Group-Theoretic Approach to the Enhancement of the Fourier Modal Method for Crossed Gratings: C2 Symmetry Case, Apr. 2005, Journal of the Optical Society of America A, vol. 22, No. 4, pp. 654-661.*
Reciprocal lattice—Wikipedia, http://en.wikipedia.org/wiki/Reciprocal_lattice, printed Oct. 1, 2012, pp. 1-6.*
Parallelogram, Wikipedia, printed Apr. 21, 2016, pp. 1-10.*
(Continued)

*Primary Examiner* — Kamini S Shah
*Assistant Examiner* — Juan Ochoa
(74) *Attorney, Agent, or Firm* — Blakely, Sokoloff, Taylor & Zafman, LLP

(57) ABSTRACT

A method for improving computation efficiency for diffraction signals in optical metrology is described. The method includes simulating a set of diffraction orders for a three-dimensional structure. The diffraction orders within the set of diffraction orders are then prioritized. The set of diffraction orders is truncated to provide a truncated set of diffraction orders based on the prioritizing. Finally, a simulated spectrum is provided based on the truncated set of diffraction orders.

18 Claims, 16 Drawing Sheets

(56) References Cited

OTHER PUBLICATIONS

Noponen and Turunen, "Eigenmode method for electromagnetic synthesis of diffractive elements with threedimensional profiles", 1994, J. Opt. Soc. Am. A/vol. 11, pp. 2494-2502.*
Lifeng Li, "Formulation and comparison of two recursive matrix algorithms for modeling layered diffraction gratings", 1996, Journal Optical Society of America A/vol. 13, pp. 1024-1035.*
Li, Lifeng "Note on the *S*-matrix propagation algorithm," Optical Society of America, vol. 20, No. 4, Apr. 2003, pp. 655-660.
Li, Lifeng "New formulation of the Fourier modal method for crossed surface-relief gratings," Optical Society of America, vol. 14, No. 10, Oct. 1997, pp. 2758-2767.

* cited by examiner $$\begin{pmatrix} E_{1mn} \\ E_{2mn} \\ H_{1mn} \\ H_{2mn} \end{pmatrix} = \begin{bmatrix} E_{1mnq} & E_{1mnq} \\ E_{2mnq} & E_{2mnq} \\ H_{1mnq} & -H_{1mnq} \\ H_{2mnq} & -H_{2mnq} \end{bmatrix} \times \begin{bmatrix} \exp(i\gamma_q x^3) & 0 \\ 0 & \exp(-i\gamma_q x^3) \end{bmatrix} \begin{pmatrix} u_q \\ d_q \end{pmatrix}$$

FIG. 5

$$J = \frac{\partial R_{0\,TE|TM}}{\partial CD_{x|y,top|bottom}}$$

$$S = \sqrt{\frac{\sum_n S_\lambda^2}{n-1}}$$

$$S_\lambda = \frac{(R_{CD\text{-}\Delta CD}(\lambda) - R_{CD}(\lambda))}{R_{CD}(\lambda)}$$

FIG. 6

FLOWCHART 1100

$$\cos\zeta \frac{k_0}{i} \partial_3 \begin{pmatrix} E_1 \\ E_2 \end{pmatrix} = F \begin{pmatrix} H_1 \\ H_2 \end{pmatrix}$$

$$\cos\zeta \frac{k_0}{i} \partial_3 \begin{pmatrix} H_1 \\ H_2 \end{pmatrix} = G \begin{pmatrix} E_1 \\ E_2 \end{pmatrix}$$

$$F = \begin{bmatrix} \alpha[[\epsilon]]^{-1}\beta - \mu k_0^2 \sin\zeta & \mu k_0^2 - \alpha[[\epsilon]]^{-1}\alpha \\ \beta[[\epsilon]]^{-1}\beta - \mu k_0^2 & \mu k_0^2 \sin\zeta - \beta[[\epsilon]]^{-1}\alpha \end{bmatrix}$$

$$G = \begin{bmatrix} \mu k_0^2 \sin\zeta \left[\!\left[\frac{1}{\epsilon}\right]\!\right]^{-1} - \alpha\beta & \alpha^2 - \mu k_0^2 \left(\cos^2\zeta \lceil\lfloor\epsilon\rfloor\rceil + \sin^2\zeta \left[\!\left[\frac{1}{\epsilon}\right]\!\right]^{-1}\right) \\ \mu k_0^2 \left(\cos^2\zeta \lfloor\lceil\epsilon\rceil\rfloor + \sin^2\zeta \left[\!\left[\frac{1}{\epsilon}\right]\!\right]^{-1}\right) - \beta^2 & \alpha\beta - \mu k_0^2 \sin\zeta \left[\!\left[\frac{1}{\epsilon}\right]\!\right]^{-1} \end{bmatrix}$$

FIG. 12B

$$\lfloor\lceil\varepsilon\rceil\rfloor_{mn,m'n'} = \frac{1}{p_1}\int_{-\frac{p_1}{2}}^{+\frac{p_1}{2}} dx^1 \left[\frac{1}{\varepsilon}(x^1)\right]^{-1} \exp\left[ix^1(m-m')\frac{2\pi}{p_1}\right]$$

$$\left\lceil\frac{1}{\varepsilon}\right\rceil = \frac{1}{p_2}\int_{-\frac{p_2}{2}}^{+\frac{p_2}{2}} dx^2 \frac{1}{\varepsilon(x^1,x^2)} \exp\left[ix^2(n-n')\frac{2\pi}{p_2}\right]$$

$$\lceil\lfloor\varepsilon\rfloor\rceil_{mn,m'n'} = \frac{1}{p_2}\int_{-\frac{p_2}{2}}^{+\frac{p_2}{2}} dx^2 \left[\frac{1}{\varepsilon}(x^2)\right]^{-1} \exp\left[ix^2(n-n')\frac{2\pi}{p_2}\right]$$

$$\left\lfloor\frac{1}{\varepsilon}\right\rfloor_{m,m'} = \frac{1}{p_1}\int_{-\frac{p_1}{2}}^{+\frac{p_1}{2}} dx^1 \frac{1}{\varepsilon(x^1,x^2)} \exp\left[ix^1(m-m')\frac{2\pi}{p_1}\right]$$

FIG. 12C

$$\lceil\lfloor\varepsilon\rfloor\rceil \rightarrow \left[\frac{1}{\varepsilon}\right]^{-1} \quad and \quad \lfloor\lceil\varepsilon\rceil\rfloor \rightarrow [\varepsilon]$$

FIG. 12D

$$F_n = \frac{i}{\cos\zeta} \cdot \begin{pmatrix} \alpha\varepsilon^{-1}\beta_n - \sin\zeta & 1 - \alpha\varepsilon^{-1}\alpha \\ \beta_n\varepsilon^{-1}\beta_n - 1 & \sin\zeta - \beta_n\varepsilon^{-1}\alpha \end{pmatrix}$$

$$G_n = \frac{i}{\cos\zeta} \cdot \begin{pmatrix} \left[\frac{1}{\varepsilon}\right]^{-1}\sin\zeta - \alpha\beta_n & \alpha^2 - \left[\frac{1}{\varepsilon}\right]^{-1} \\ \varepsilon\cos^2\zeta + \left[\frac{1}{\varepsilon}\right]^{-1}\sin^2\zeta - \beta_n^2 & \alpha\beta_n - \left[\frac{1}{\varepsilon}\right]^{-1}\sin\zeta \end{pmatrix}$$

FIG. 12E $$\lceil\lfloor\varepsilon\rfloor\rceil \rightarrow [\varepsilon] \quad and \quad \lfloor\lceil\varepsilon\rceil\rfloor \rightarrow \left[\frac{1}{\varepsilon}\right]^{-1}$$

FIG. 12F $$F_m = \frac{i}{\cos\zeta} \cdot \begin{pmatrix} \alpha_m\varepsilon^{-1}\beta - \sin\zeta & 1 - \alpha_m\varepsilon^{-1}\alpha_m \\ \beta\varepsilon^{-1}\beta - 1 & \sin\zeta - \beta\varepsilon^{-1}\alpha_m \end{pmatrix}$$

$$G_m = \frac{i}{\cos\zeta} \cdot \begin{pmatrix} \left[\frac{1}{\varepsilon}\right]^{-1}\sin\zeta - \alpha_m\beta & \alpha_m^2 - \varepsilon\cos^2\zeta - \left[\frac{1}{\varepsilon}\right]^{-1}\sin^2\zeta \\ \left[\frac{1}{\varepsilon}\right]^{-1} - \beta^2 & \alpha_m\beta - \left[\frac{1}{\varepsilon}\right]^{-1}\sin\zeta \end{pmatrix}$$

FIG. 12G

COMPUTATION EFFICIENCY BY DIFFRACTION ORDER TRUNCATION

TECHNICAL FIELD

Embodiments of the present invention are in the field of Optical Metrology, and, more particularly, relate to the selection of the number of diffraction orders to use in generating a simulated diffraction signal for use in optical metrology measurement, processing, or simulation for three-dimensional structures.

BACKGROUND

For the past several years, a rigorous couple wave approach (RCWA) and similar algorithms have been widely used for the study and design of diffraction structures. In the RCWA approach, the profiles of periodic structures are approximated by a given number of sufficiently thin planar grating slabs. Specifically, RCWA involves three main steps, namely, the Fourier expansion of the field inside the grating, calculation of the eigenvalues and eigenvectors of a constant coefficient matrix that characterizes the diffracted signal, and solution of a linear system deduced from the boundary matching conditions. RCWA divides the problem into three distinct spatial regions: 1) the ambient region supporting the incident plane wave field and a summation over all reflected diffracted orders, 2) the grating structure and underlying non-patterned layers in which the wave field is treated as a superposition of modes associated with each diffracted order, and 3) the substrate containing the transmitted wave field.

The accuracy of the RCWA solution depends, in part, on the number of terms retained in the space-harmonic expansion of the wave fields, with conservation of energy being satisfied in general. The number of terms retained is a function of the number of diffraction orders considered during the calculations. Efficient generation of a simulated diffraction signal for a given hypothetical profile involves selection of the optimal set of diffraction orders at each wavelength for both transverse-magnetic (TM) and/or transverse-electric (TE) components of the diffraction signal. Mathematically, the more diffraction orders selected, the more accurate the simulations. However, the higher the number of diffraction orders, the more computation is required for calculating the simulated diffraction signal. Moreover, the computation time is a nonlinear function of the number of orders used. Thus, it is useful to minimize the number of diffraction orders simulated at each wavelength. However, the number of diffraction orders cannot arbitrarily be minimized as this might result in loss of information.

The importance of selecting the appropriate number of diffraction orders increases significantly when three-dimensional structures are considered in comparison to two-dimensional structures. Since the selection of the number of diffraction orders is application specific, efficient approaches for selecting the number of diffraction orders is desirable.

SUMMARY OF THE INVENTION

An aspect of the invention includes a method for improving computation efficiency for diffraction signals in optical metrology. A set of diffraction orders is determined for a three-dimensional structure. The diffraction orders within the set of diffraction orders are prioritized. The set of diffraction orders is truncated to provide a truncated set of diffraction orders based on the prioritizing. A simulated spectrum is then provided based on the truncated set of diffraction orders. In one embodiment of the invention, truncating the set of diffraction orders includes retaining only the diffraction orders that fall within a basic schema. In a specific embodiment of the invention, the basic schema is a shape selected from the group consisting of a diamond, a square, a rectangle, a circle, a rotated diamond and a star.

Another aspect of the invention includes a method for improving computation efficiency for diffraction signals in optical metrology. A set of diffraction orders is determined for a structure having a three-dimensional component and a two-dimensional component. The diffraction orders within the set of diffraction orders are prioritized. The set of diffraction orders is truncated to provide a truncated set of diffraction orders based on the prioritizing. A simulated spectrum is provided based on the truncated set of diffraction orders.

Another aspect of the invention includes a computer-readable medium having stored thereon a set of instructions. The set of instructions is included to perform a method including determining a set of diffraction orders for a three-dimensional structure, prioritizing the diffraction orders within the set of diffraction orders, truncating the set of diffraction orders to provide a truncated set of diffraction orders based on the prioritizing, and providing a simulated spectrum based on the truncated set of diffraction orders.

BRIEF DESCRIPTION OF THE DRAWINGS

FIG. 5 represents the Fourier coefficients of the tangential components of the total fields in terms of the unknown field amplitudes and, thus, represents an equation for expressing the S-matrix in one slice or layer, in accordance with an embodiment of the present invention.

FIG. 6 represents equations for use in applying the Jacobi method to prioritize diffraction orders within a simulated set of diffraction orders, in accordance with an embodiment of the present invention.

FIGS. 12B-12G represent equations for use in applying computation optimization to a simulated set of diffraction orders for a structure having both a two-dimensional component and a three-dimensional component, in accordance with an embodiment of the present invention.

DETAILED DESCRIPTION

Figure 1:
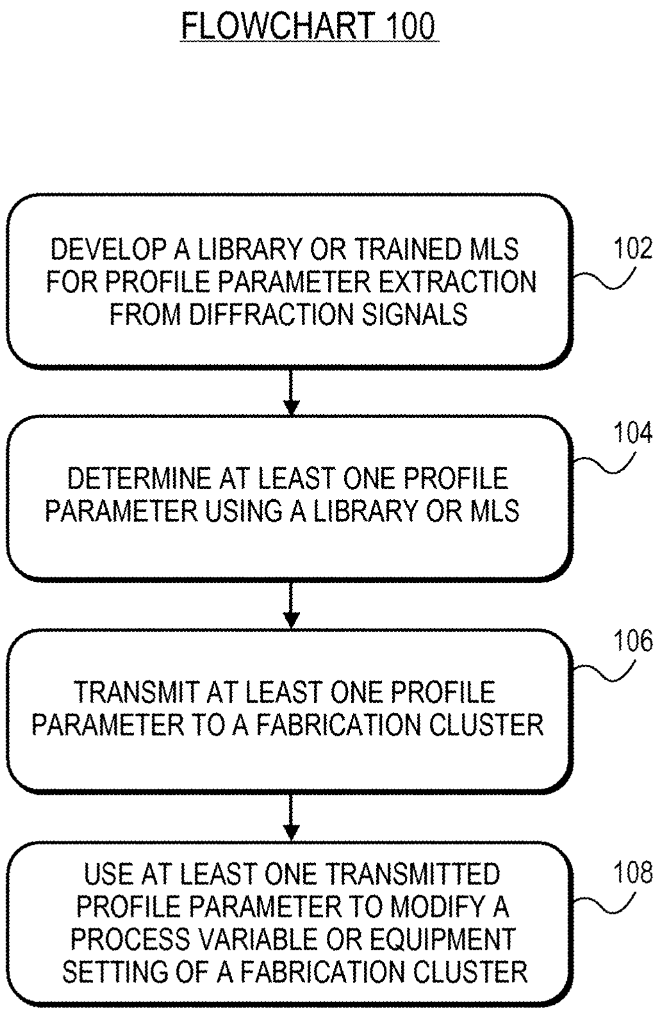
FIG. 1 depicts a Flowchart representing an exemplary series of operations for determining and utilizing profile parameters for automated process and equipment control, in accordance with an embodiment of the present invention.

Methods for computation efficiency by optimized order truncation are described herein. In the following description, numerous specific details are set forth, such as specific truncated diffraction patterns, in order to provide a thorough understanding of the present invention. It will be apparent to one skilled in the art that the present invention may be practiced without these specific details. In other instances, well-known processing steps, such as fabricating stacks of patterned material layers, are not described in detail in order to not unnecessarily obscure the present invention. Furthermore, it is to be understood that the various embodiments shown in the Figures are illustrative representations and are not necessarily drawn to scale.

Disclosed herein is a method for improving computation efficiency for diffraction signals in optical metrology. A set of diffraction orders for a three-dimensional structure may be determined. In accordance with an embodiment of the present invention, the diffraction orders within the set of diffraction orders are then prioritized. The set of diffraction orders may then be truncated to provide a truncated set of diffraction orders based on the prioritizing. In one embodiment, a simulated spectrum is provided based on the truncated set of diffraction orders.

Orders of a diffraction signal may be simulated as being derived from a periodic structure. The zeroth order represents a diffracted signal at an angle equal to the angle of incidence of a hypothetical incident beam, with respect to the normal N of the periodic structure. Higher diffraction orders are designated as +1, +2, +3, −1, −2, −3, etc. Other orders known as evanescent orders may also be considered. In accordance with an embodiment of the present invention, a simulated diffraction signal is generated for use in optical metrology. In one embodiment, efficient generation of a simulated diffraction signal for a given structure profile involves selecting the number of diffraction orders that provide sufficient diffraction information without overly increasing the computational steps to perform diffraction simulations.

A forward simulation algorithm for diffraction patterns generated from three-dimensional structures can be very time consuming to perform. For example, the use of many diffraction orders may result in a very costly calculation process. However, in accordance with an embodiment of the present invention, some of the orders play a more important role than others. Thus, in one embodiment, there are certain orders that can be omitted prior to performing a computation process based on a set of diffraction orders. Accordingly, a set of diffraction orders determined from a simulated diffraction pattern for a hypothetical three-dimensional structure may be truncated to provide a truncated set of diffraction orders. This more efficient computation process may be enabled by first identifying and sorting the diffraction orders prior to performing the computation. In a specific embodiment, a simulated spectrum is determined based on calculations involving the truncated set of diffraction orders. The simulated spectrum may then be compared to a sample spectrum.

Calculations based on a truncated set of simulated diffraction orders may be indicative of profile parameters for a patterned film, such as a patterned semiconductor film or photo-resist layer, and may be used for calibrating automated processes or equipment control. FIG. 1 depicts a Flowchart 100 representing an exemplary series of operations for determining and utilizing profile parameters for automated process and equipment control, in accordance with an embodiment of the present invention.

Referring to operation 102 of Flowchart 100, a library or trained machine learning systems (MLS) is developed to extract profile parameters from a set of measured diffraction signals. In operation 104, at least one profile parameter of a structure is determined using the library or the trained MLS. In operation 106, the at least one profile parameter is transmitted to a fabrication cluster configured to perform a processing step, where the processing step may be executed in the semiconductor manufacturing process flow either before or after measurement step 104 is made. In operation 108, the at least one transmitted profile parameter is used to modify a process variable or equipment setting for the processing step performed by the fabrication cluster. For a more detailed description of machine learning systems and algorithms, see U.S. patent application Ser. No. 10/608,300, entitled OPTICAL METROLOGY OF STRUCTURES FORMED ON SEMICONDUCTOR WAFERS USING MACHINE LEARNING SYSTEMS, filed on Jun. 27, 2003, published as U.S. Patent Application Publication No. 2004-0267397 on Dec. 30, 2004, which is incorporated herein by reference in its entirety. For a description of diffraction order optimization for two dimensional repeating structures, see U.S. patent application Ser. No. 11/388,265, entitled OPTIMIZATION OF DIFFRACTION ORDER SELECTION FOR TWO-DIMENSIONAL STRUCTURES, filed on Mar. 24, 2006, now U.S. Pat. No. 7,428,060, issued Sep. 23, 2008, which is incorporated herein by reference in its entirety.

Figure 2:
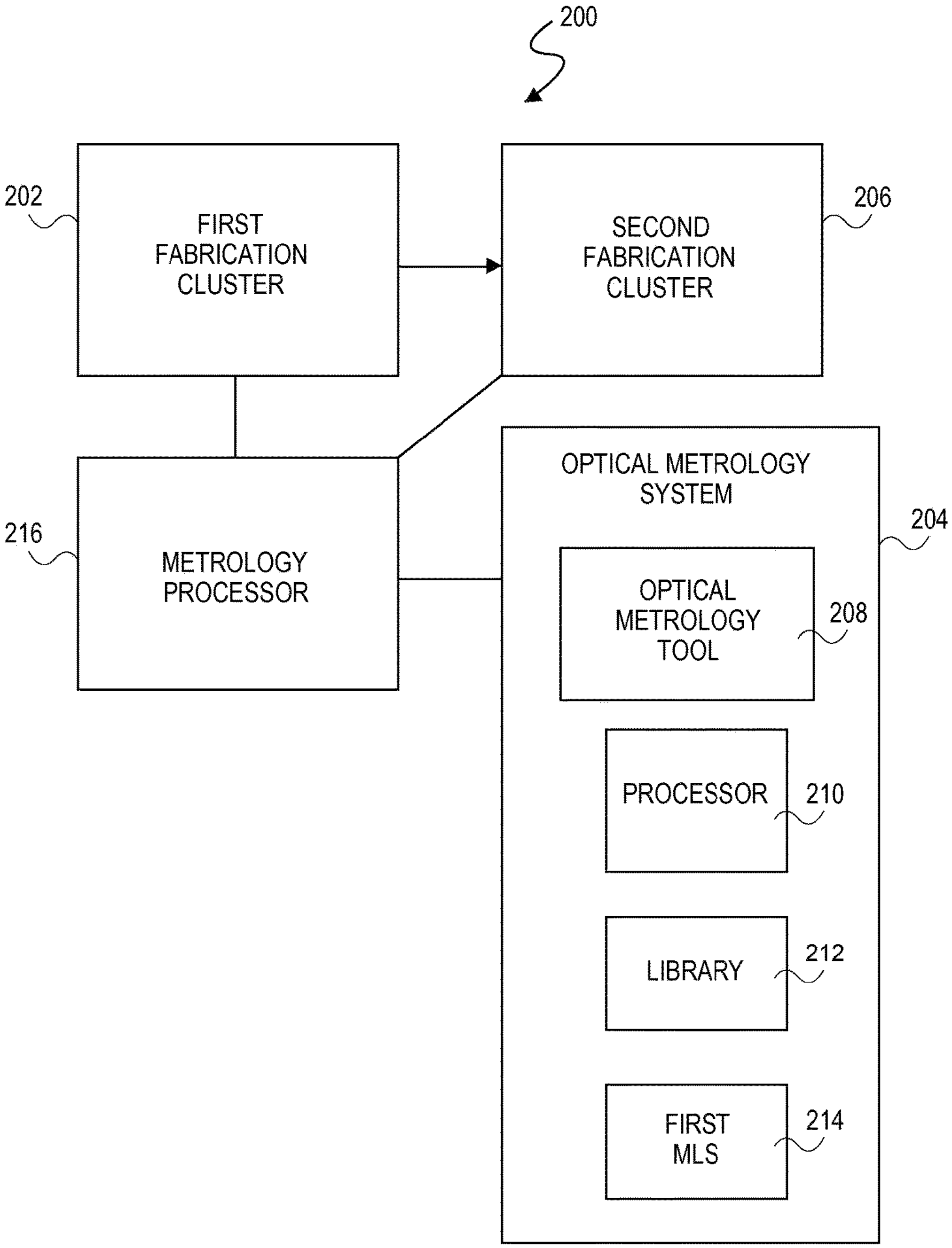
FIG. 2 is an exemplary block diagram of a system for determining and utilizing profile parameters for automated process and equipment control, in accordance with an embodiment of the present invention.

FIG. 2 is an exemplary block diagram of a system 200 for determining and utilizing profile parameters for automated process and equipment control, in accordance with an embodiment of the present invention. System 200 includes a first fabrication cluster 202 and optical metrology system 204. System 200 also includes a second fabrication cluster 206. Although the second fabrication cluster 206 is depicted in FIG. 2 as being subsequent to first fabrication cluster 202, it should be recognized that second fabrication cluster 206 can be located prior to first fabrication cluster 202 in system 200 (and, e.g., in the manufacturing process flow).

A photolithographic process, such as exposing and developing a photo-resist layer applied to a wafer, can be performed using first fabrication cluster 202. In one exemplary embodiment, optical metrology system 204 includes an optical metrology tool 208 and processor 210. Optical metrology tool 208 is configured to measure a diffraction signal obtained from the structure. If the measured diffraction signal and the simulated diffraction signal match, one or more values of the profile parameters are determined to be the one or more values of the profile parameters associated with the simulated diffraction signal.

In one exemplary embodiment, optical metrology system 204 can also include a library 212 with a plurality of simulated diffraction signals and a plurality of values of one or more profile parameters associated with the plurality of simulated diffraction signals. As described above, the library can be generated in advance. Metrology processor 210 can compare a measured diffraction signal obtained from a structure to the plurality of simulated diffraction signals in the library. When a matching simulated diffraction signal is found, the one or more values of the profile parameters associated with the matching simulated diffraction signal in the library is assumed to be the one or more values of the profile parameters used in the wafer application to fabricate the structure.

System 200 also includes a metrology processor 216. In one exemplary embodiment, processor 210 can transmit the one or more values of the one or more profile parameters to metrology processor 216. Metrology processor 216 can then adjust one or more process parameters or equipment settings of first fabrication cluster 202 based on the one or more values of the one or more profile parameters determined using optical metrology system 204. Metrology processor 216 can also adjust one or more process parameters or equipment settings of the second fabrication cluster 206 based on the one or more values of the one or more profile parameters determined using optical metrology system 204. As noted above, fabrication cluster 206 can process the wafer before or after fabrication cluster 202. In another exemplary embodiment, processor 210 is configured to train machine learning system 214 using the set of measured diffraction signals as inputs to machine learning system 214 and profile parameters as the expected outputs of machine learning system 214.

Figure 3:
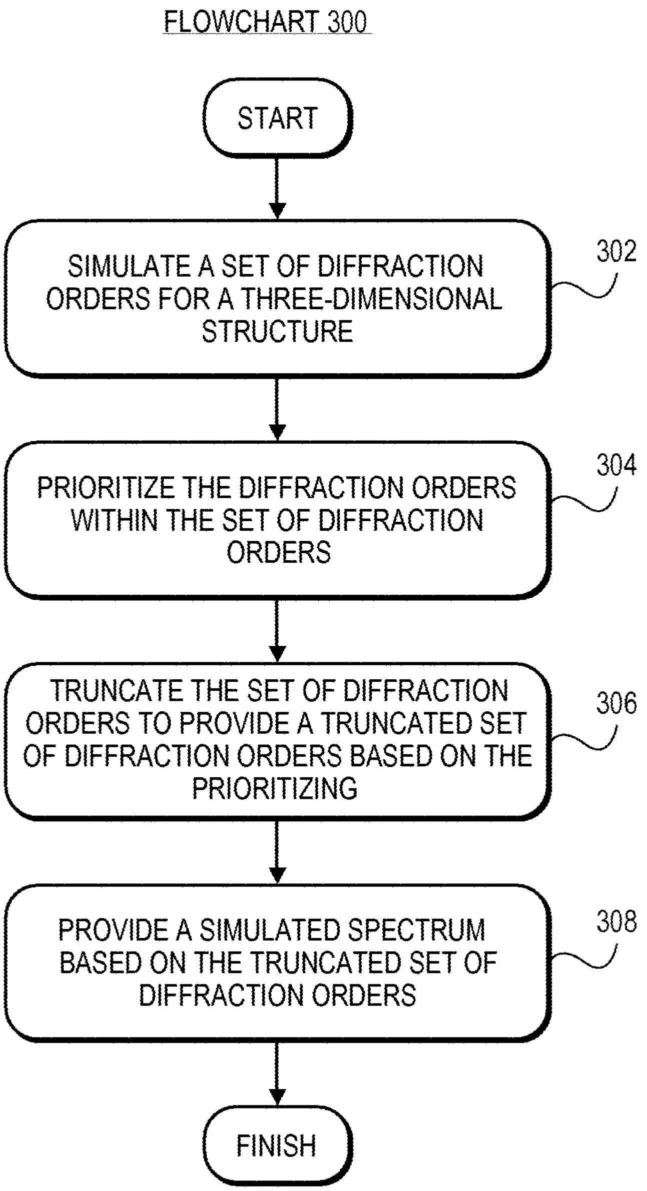
FIG. 3 depicts a Flowchart representing an exemplary series of operations for improving computation efficiency for simulated diffraction signals in optical metrology, in accordance with an embodiment of the present invention.

In an aspect of the present invention, the computation efficiency for calculations based on diffraction orders, obtained from simulated diffractions signals, is improved for optical metrology applications by truncating a set of diffraction orders prior to performing the calculations. FIG. 3 depicts a Flowchart representing an exemplary series of operations for improving computation efficiency for simulated diffraction signals in optical metrology, in accordance with an embodiment of the present invention.

Figure 4A:
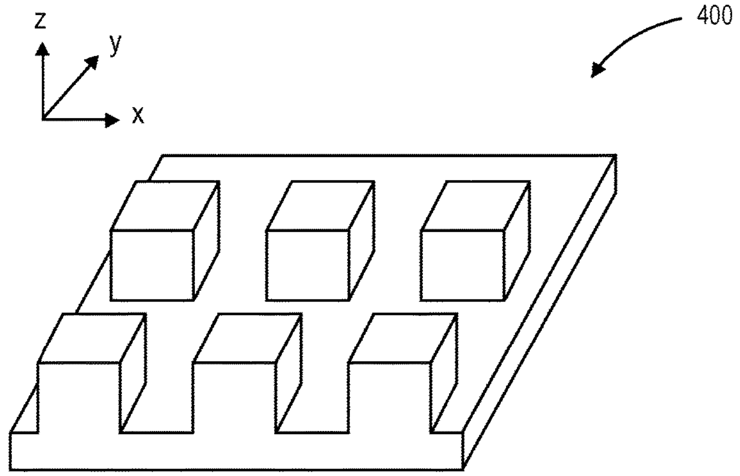
FIG. 4A depicts a periodic grating 400 having a profile that varies in the x-y plane, in accordance with an embodiment of the present invention.
Figure 4B:
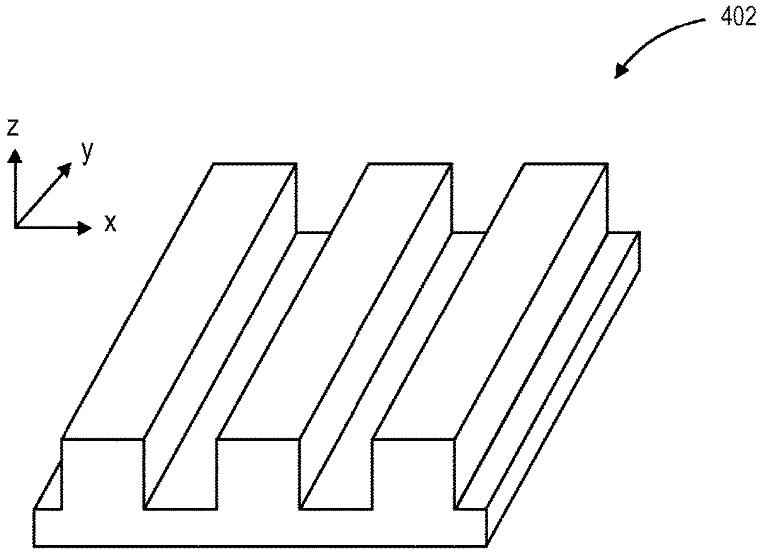
FIG. 4B depicts a periodic grating 402 having a profile that varies in the x-direction but not in the y-direction, in accordance with an embodiment of the present invention.

Referring to operation 302 of Flowchart 300, a set of diffraction orders is simulated for a three-dimensional structure. The term "three-dimensional structure" is used herein to refer to a structure having an x-y profile that varies in two dimensions in addition to a depth in the z-direction. For example, FIG. 4A depicts a periodic grating 400 having a profile that varies in the x-y plane, in accordance with an embodiment of the present invention. The profile of the periodic grating varies in the z-direction as a function of the x-y profile. By comparison, the term "two-dimensional structure" is used herein to refer to a structure having an x-y profile that varies in only one dimension in addition to a depth in the z-direction. For example, FIG. 4B depicts a periodic grating 402 having a profile that varies in the x-direction but not in the y-direction, in accordance with an embodiment of the present invention. The profile of the periodic grating varies in the z-direction as a function of the x profile. It is to be understood that the lack of variation in the y-direction for a two-dimensional structure need not be infinite, but any breaks in the pattern are considered long range, i.e. any breaks in the pattern in the y-direction are spaced substantially further apart than the brakes in the pattern in the x-direction.

In accordance with an embodiment of the present invention, the set of diffraction orders is simulated to represent diffraction signals from a three-dimensional structure generated by an ellipsometric optical metrology system, such as the optical metrology system 1300 described below in association with FIG. 13. However, it is to be understood that the same concepts and principles equally apply to the other optical metrology systems, such as reflectometric systems. The diffraction signals represented may account for features of the three-dimensional structure such as, but not limited to, profile, dimensions or material composition. In one embodiment, the size of the set of diffraction orders, i.e. the number of diffraction orders initially simulated, is of finite size and greater than the number of diffraction orders needed computationally to satisfactorily generate a representative spectrum based on the set of diffraction orders. In a specific embodiment, the size of the set of simulated diffraction orders is of a size sufficient to undergo a truncation process, i.e. to undergo a removal of some of the diffraction orders, wherein the truncation process provides a truncated set of simulated diffraction orders that may be used to generate a representative spectrum.

Referring to operation 304 of Flowchart 300, diffraction orders within the set of simulated diffraction orders are prioritized. In accordance with an embodiment of the present invention, the diffraction orders are prioritized with highest priority given to those orders that carry the most information regarding the three-dimensional structure. In one embodiment, prioritizing the diffraction orders includes identifying their energy distribution in the k-space. In an embodiment, the information associated with the diffraction orders is used directly. For example, in one embodiment, both grating and material information is associated with the diffraction orders in the form of an $\epsilon$-matrix and the $\epsilon$-matrix is used directly to prioritize the diffraction orders.

However, in another embodiment, prioritizing the diffraction orders includes comparing the set of diffraction orders with the final energy distribution of the diffraction orders within the set of diffraction orders. In one embodiment, in order to obtain the final energy distribution of the orders, the $\epsilon$-matrix is transformed to a pure scattering matrix (S-Matrix). To apply an S-matrix algorithm, the Fourier coefficients of the $\epsilon$-matrix need to be expressed in terms of unknown field amplitudes. FIG. 5 represents the Fourier coefficients of the tangential components of the total fields in terms of the unknown field amplitudes and, thus, represents an equation for expressing the S-matrix in one slice or layer, in accordance with an embodiment of the present invention. Referring to the equation of FIG. 5, each matrix element symbolizes a rectangular block matrix. For example, $E_{1mnq}$ represents a matrix whose leading dimension runs through all m and n and whose trailing dimension runs through all q. The Fourier coefficients of the tangential field components ($E_{1mn}$, $E_{2mn}$, $H_{1mn}$, $H_{2mn}$) are expressed in terms of the unknown field amplitudes ($u_q$ and $d_q$). The indices m and n are the Fourier order indices in directions 1 and 2, e.g., x and y for an orthogonal system. The index q is the index for the Eigen solutions with, e.g., Re(γ)+Im(γ) >0. The elements of the first coupling matrix are formed by the Eigen vectors of the Eigen equation, whereas the diagonal elements of the second coupling matrix are diagonal matrices. The variables in the exponential function include γ (the square root of $\gamma^2$), $x^3$ (the contra-variant normal coordinate), and i (the square root of −1). Referring again to FIG. 5, the second matrix propagates the (decoupled) up and down waves within a slice or through a certain distance $x^3$. In one embodiment, following the S-matrix algorithm, the unknown Raleigh amplitudes can be calculated. It is to be understood that the S-matrix algorithm has many implementation variants. Also, in a specific embodiment, prioritizing the diffraction orders includes modifying the set of diffraction orders with a coupling matrix. For example, in an embodiment, the ϵ-matrix is transformed to the S-Matrix via first and intermediate transformation to an FG-matrix.

In another embodiment, prioritizing the diffraction orders includes operating on the set of diffraction orders with the Jacobi method. FIG. 6 represents equations for use in applying the Jacobi method to prioritize diffraction orders within a simulated set of diffraction orders, in accordance with an embodiment of the present invention. The Jacobi method is an algorithm in linear algebra for determining the solutions of a system of linear equations with largest absolute values in each row and column dominated by the diagonal element. Each diagonal element is solved for, and an approximate value is plugged in. In one embodiment, the process is then iterated until it converges. Referring to FIG. 6, J is the Jacobi matrix assembled from the derivatives of the signal (e.g., reflectivity, tan ψ and cos δ, ellipsometric α and β) for a profile or light parameter (e.g., critical dimension (CD), height, slope angle or angle of incidence, azimuth, wavelength, etc.). $S_\lambda$ is the spectral sensitivity, i.e., the normalized signal change caused by a CD (or other profile parameter) change and S is the total sensitivity over a certain wavelength range (summation over λ).

Referring to operation 306 of Flowchart 300, the simulated set of diffraction orders is truncated to provide a truncated set of diffraction orders based on the prioritizing from operation 304. In accordance with an embodiment of the present invention, the diffraction orders are truncated to preserve only those orders that are associated with the most information pertaining to a three-dimensional structure. That is, those orders that are associated with relatively little information are removed from the set of diffraction orders. In an embodiment, the truncation operation permits the generation of a truncated set of diffraction orders which holds most of the information of the simulated set of diffraction orders, but with fewer diffraction orders, enabling a highly accurate yet less costly subsequent computation process. It is to be understood that, in accordance with an alternative embodiment of the present invention, the operation of prioritizing the diffraction orders within the set of simulated diffraction orders and truncating the simulated set of diffraction orders to provide a truncated set of diffraction orders can be performed in the same computation step.

Figure 7:
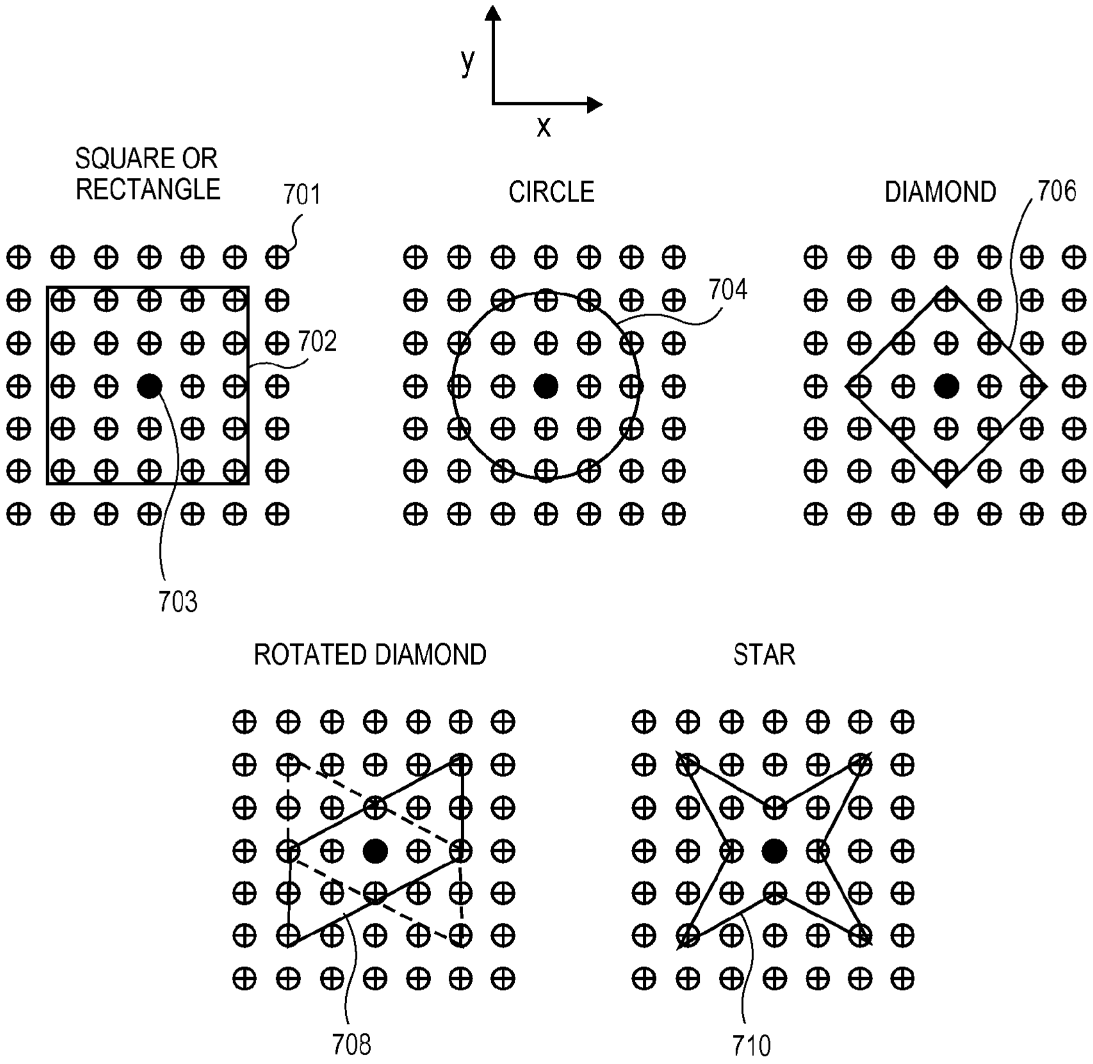
FIG. 7 represents a variety of schemas for truncation, in accordance with an embodiment of the present invention.

In one embodiment, truncating the set of diffraction orders includes retaining only the diffraction orders that fall within a basic schema. In an embodiment, the basic schema is a shape in the k-space such as, but not limited to, a diamond, a square, a rectangle, a circle, a rotated diamond or a star, as depicted in FIG. 7. In a specific embodiment, referring to FIG. 7, a square-shaped schema 702 forms a perimeter around several diffraction orders in a set of diffraction orders. The diffraction orders are represented by dots 701 and include the zeroth order which is depicted by the blacked-in dot 703. In accordance with an embodiment of the present invention, those diffraction orders that fall within, or touch on a perimeter of, square-shaped schema 702 are retained in the truncated set of diffraction orders, while those that fall outside are removed. For example, in one embodiment, square-shaped schema 702 includes the zeroth diffraction order in addition to +2, +1, −1, −2 orders in the x-direction and +2, +1, −1, −2 or y-direction, and all combinations thereof, as depicted in FIG. 7. However, truncation is not limited or need not include these twenty-five diffraction orders, e.g. a smaller or larger square may be used or a rectangular-shaped schema may be used. Also, it should be recognized that, in accordance with an alternative embodiment, the basic schema can exclude one or more orders to form a non-continuous schema. Also, in one embodiment, the basic schema can be asymmetric with respect to the zeroth order.

In another specific embodiment, referring again to FIG. 7, a circle-shaped schema 704 forms a perimeter around several diffraction orders in a set of diffraction orders, including the zeroth order which is depicted by the blacked-in dot. In that embodiment, circle-shaped schema 704 includes the zeroth diffraction order in addition to +2, +1, −1, −2 orders in the x-direction and +2, +1, −1, −2 orders in the y-direction, and those combinations thereof that fall within or on the perimeter of circle-shaped schema 704, as depicted in FIG. 7. However, truncation is not limited or need not include these twenty-one diffraction orders, e.g. a smaller or larger circle may be used.

In another specific embodiment, referring again to FIG. 7, a diamond-shaped schema 706 forms a perimeter around several diffraction orders in a set of diffraction orders, including the zeroth order which is depicted by the blacked-in dot. In that embodiment, diamond-shaped schema 706 includes the zeroth diffraction order in addition to +2, +1, −1, −2 orders in the x-direction and +2, +1, −1, −2 orders in the y-direction, and those combinations thereof that fall within or on the perimeter of diamond-shaped schema 706, as depicted in FIG. 7. However, truncation is not limited or need not include these thirteen diffraction orders, e.g. a smaller or larger diamond or even a skewed-shaped diamond may be used.

In another specific embodiment, referring again to FIG. 7, a rotated diamond-shaped schema 708 forms a perimeter around several diffraction orders in a set of diffraction orders, including the zeroth order which is depicted by the blacked-in dot. In that embodiment, a rotated diamond-shaped schema 708 includes the zeroth diffraction order in addition to combinations of the +2, +1, −1, −2 orders in the x-direction and the +2, +1, −1, −2 orders in the y-direction that fall within or on the perimeter of the left (solid line) or right (dashed line) rotated diamond-shaped schema 708, as depicted in FIG. 7. However, truncation is not limited or need not include these nineteen diffraction orders, e.g. a smaller or larger rotated diamond.

In another specific embodiment, referring again to FIG. 7, a star-shaped schema 710 forms a perimeter around several diffraction orders in a set of diffraction orders, including the zeroth order which is depicted by the blacked-in dot. In that embodiment, star-shaped schema 710 includes the zeroth diffraction order in addition to combinations of the +2, +1, −1, −2 orders in the x-direction and the +2, +1, −1, −2 orders in the y-direction that fall within or on the perimeter of star-shaped schema 710, as depicted in FIG. 7. However, truncation is not limited or need not include these thirteen diffraction orders, e.g. a smaller or larger star may be used.

In an embodiment, several basic schemas may have to be applied individually and compared to find the method of truncation most optimal for the subsequent simulation of a spectrum representing a three-dimensional structure and based on the truncated set of diffraction orders. For example, in one embodiment, a rectangular truncation schema may be compared against a diamond-shaped truncation schema.

Figure 8:
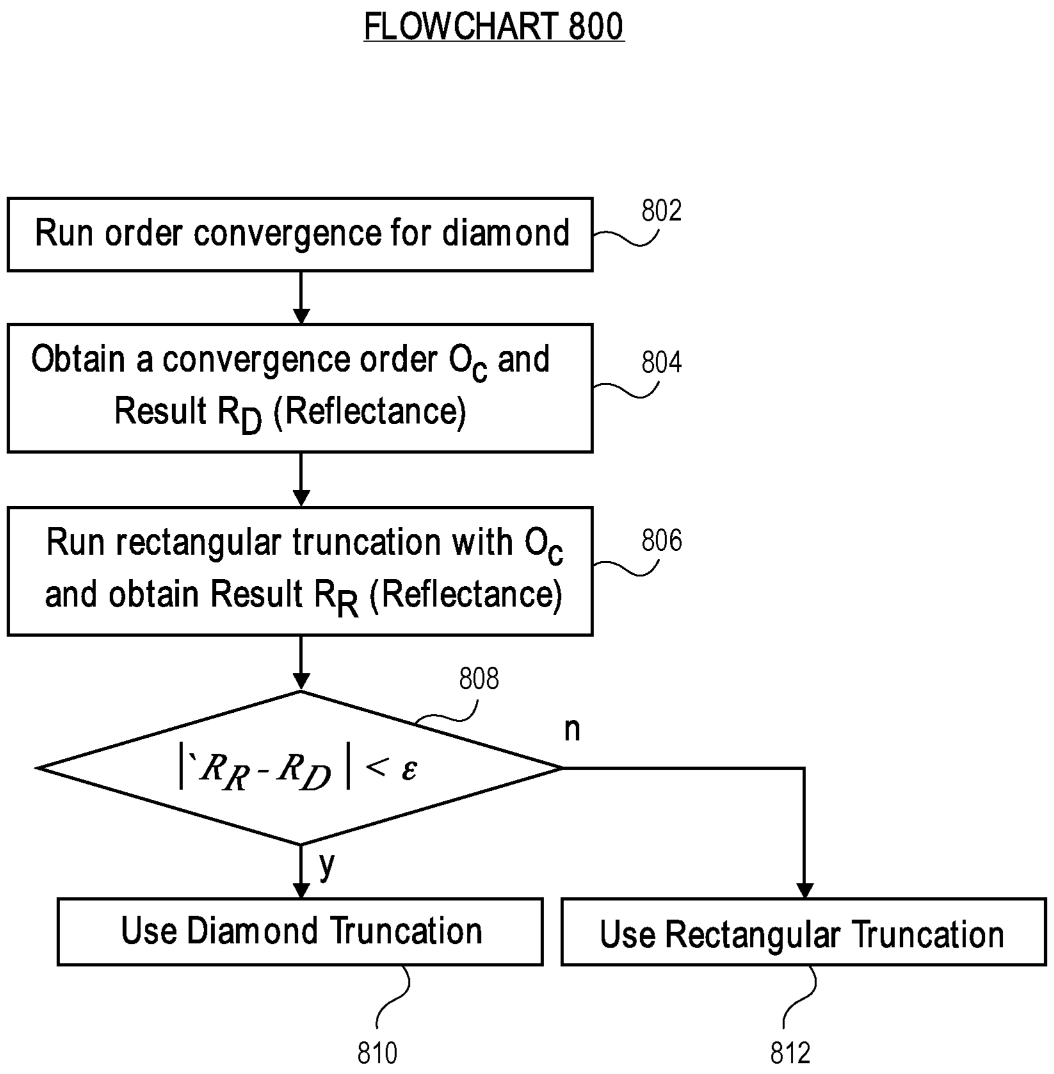
FIG. 8 depicts a Flowchart representing a series of operations in selecting between a rectangular truncation schema and a diamond-shaped truncation schema, in accordance with an embodiment of the present invention.

FIG. 8 depicts a Flowchart 800 representing a series of operations in selecting between a rectangular truncation schema and a diamond-shaped truncation schema, in accordance with an embodiment of the present invention. Referring to operation 802 of Flowchart 800, order convergence is run for the diamond-shaped truncation schema. For example, in one embodiment, the size of the diamond and whether or not the diamond is skewed is determined in this operation. Referring to operation 804, a convergence order $O_C$ (size and shape of the diamond) is determined and a reflectance result $R_D$ is obtained based on the convergence order. Referring to operation 806, order convergence is run for the rectangular-shaped truncation schema, based on the convergence order $O_C$ determined in operation 804, and a reflectance result $R_R$ is obtained based on that convergence order. Referring to operation 808, the absolute value of the difference between results $R_D$ and $R_R$ is compared with a preset criteria, $\epsilon$. The preset criteria, $\epsilon$ is chosen to represent the maximum tolerance in error that is acceptable for a particular calculation based on a truncation scheme. Referring to operation 810, if the preset criteria is met, accuracy in the subsequent computation based on a diamond-shaped truncation is ensured even though fewer diffraction orders are retained in the truncated set. This approach takes advantage of X-Y asymmetry in the set of diffraction orders without risk of removing too much information in the truncation process. However, referring to operation 812, if the preset criteria is not met, accuracy in the subsequent computation is not ensured and a rectangular schema should be used.

Figure 9:
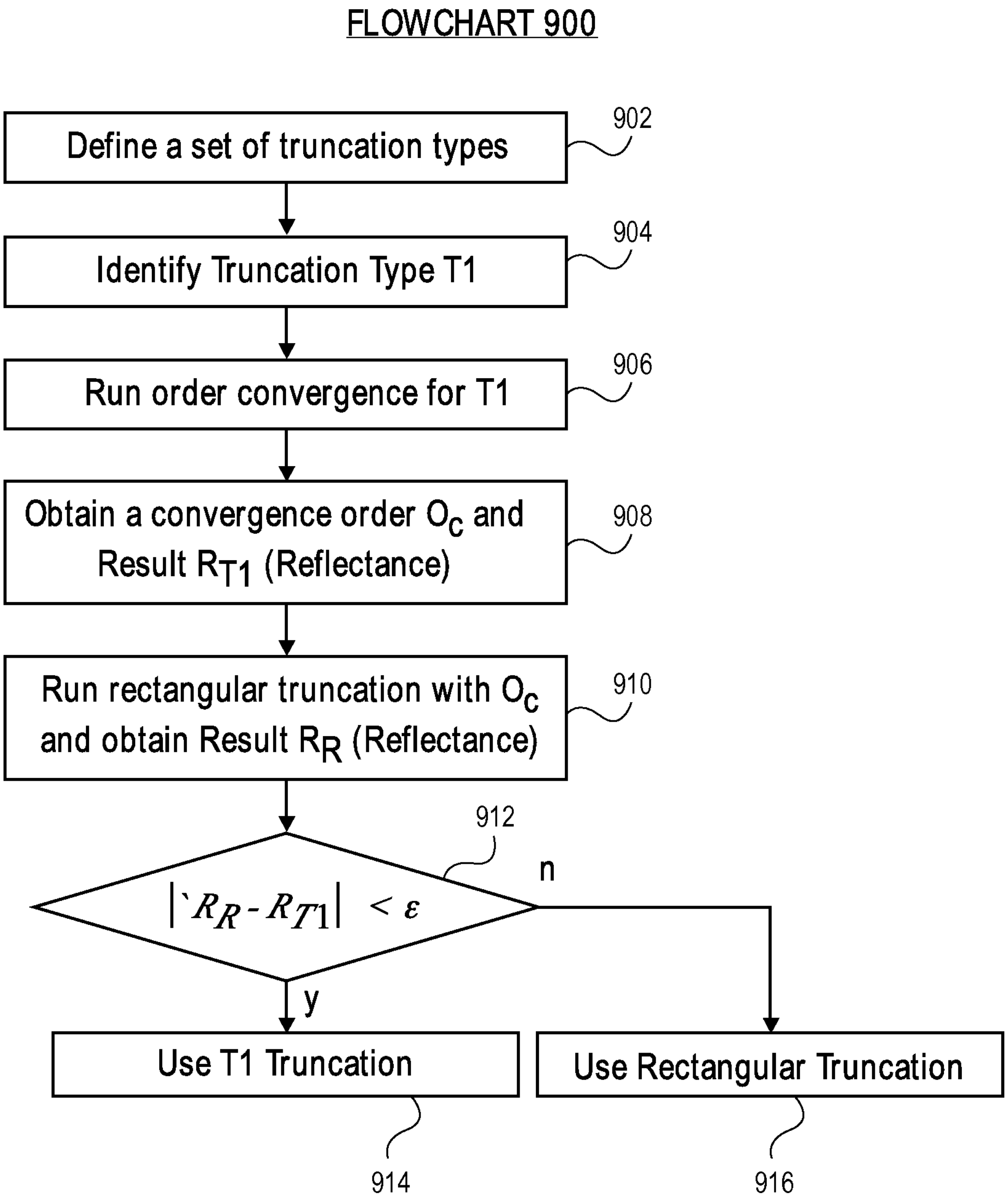
FIG. 9 depicts a Flowchart representing a series of operations in selecting between a rectangular truncation schema and a non-rectangular schema selected from a collection of non-rectangular schemas, in accordance with an embodiment of the present invention.

In an embodiment, several basic schemas may have to be applied sequentially to find the method of truncation most optimal for the subsequent simulation of a spectrum representing a three-dimensional structure and based on the truncated set of diffraction orders. In one embodiment, a non-rectangular schema, such as but not limited to a star, is selected from a collection of basic non-rectangular schemas based on a criteria, such as but not limited to an $\epsilon$-matrix. The same approach as described in association with FIG. 8 may then be applied to the chosen non-rectangular schema, e.g. a rectangular truncation schema may be compared against a the non-rectangular schemas. FIG. 9 depicts a Flowchart 900 representing a series of operations in selecting between a rectangular truncation schema and a non-rectangular schema selected from a collection of non-rectangular schemas, in accordance with an embodiment of the present invention. Referring to operation 902 of Flowchart 900, a set of truncation types is defined. In one embodiment, the set of truncation types is defined by selecting a basic schema from a group of two or more basic shape schemas, wherein the selection is arbitrary or based on a criteria. Referring to operation 904, a truncation type T1 is identified from the set of truncation types. Referring to operation 906, order convergence is run for the truncation type T1 schema. For example, in one embodiment, the size of truncation type T1 schema is determined in this operation. Referring to operation 908, a convergence order $O_C$ is determined and a reflectance result $R_{T1}$ is obtained based on the convergence order. Referring to operation 910, order convergence is run for the rectangular-shaped truncation schema, based on the convergence order $O_C$ determined in operation 908, and a reflectance result $R_R$ is obtained based on that convergence order. Referring to operation 912, the absolute value of the difference between results $R_{T1}$ and $R_R$ is compared a preset criteria, $\epsilon$. The preset criteria, $\epsilon$ is chosen to represent the maximum tolerance in error that is acceptable for a particular calculation based on a truncation scheme. Referring to operation 914, if the preset criteria is met, accuracy in the subsequent computation based on a truncation type T1 schema is ensured even though fewer diffraction orders are retained in the truncated set. However, referring to operation 916, if the preset criteria is not met, accuracy in the subsequent computation is not ensured and a rectangular schema should be used.

Figure 10:
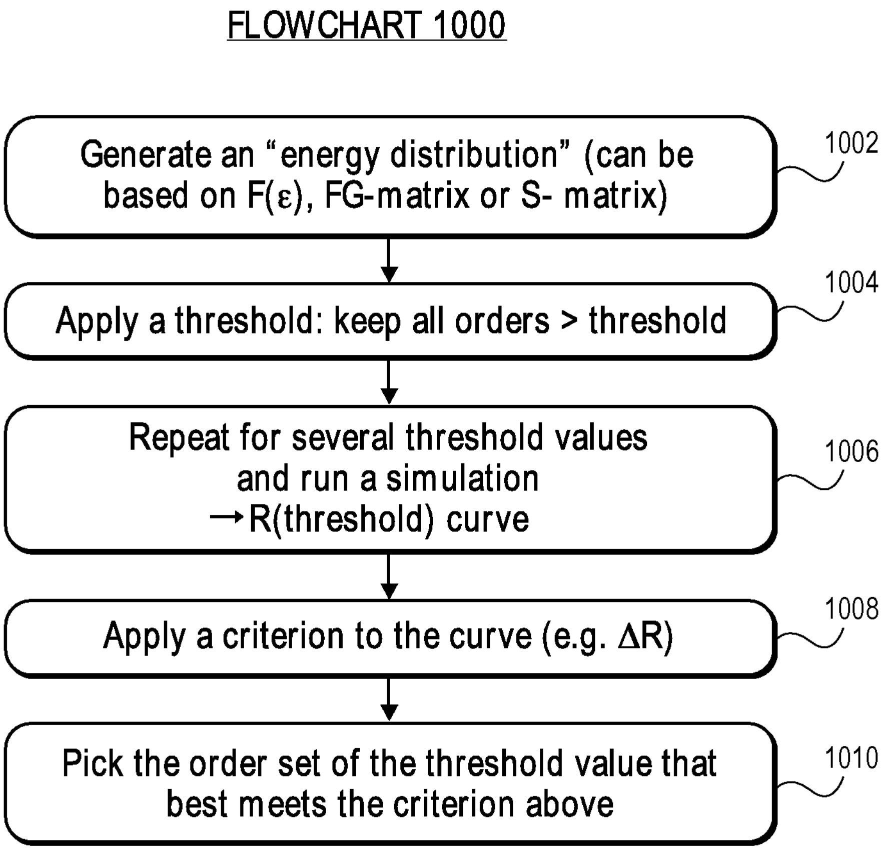
FIG. 10 depicts a Flowchart representing a series of operations in applying ordered-pair truncation, in accordance with an embodiment of the present invention.

In another embodiment, truncating the set of diffraction orders includes retaining only the diffraction orders that fall within a set of ordered pairs, i.e. a full stack solution approach is performed. FIG. 10 depicts a Flowchart 1000 representing a series of operations in applying ordered-pair truncation, in accordance with an embodiment of the present invention. Referring to operation 1002 of Flowchart 1000, an energy distribution is generated to prioritize a set of diffraction orders, as described above in association with operation 304 of Flowchart 300. Referring to operation 1004, a threshold is determined and all ordered pairs above that threshold, e.g., the order set, are retained for subsequent computation processes. Referring to operation 1006, the determination made in operation 1004 is repeated for several different threshold values and a simulation is run to provide a $\text{result}_{(threshold)}$ curve in order to compare the outputs based on varying threshold values. Referring to operation 1008, a criterion $\Delta R$ is applied against the $\text{result}_{(threshold)}$ curve. The criterion, $\Delta R$ is chosen to represent the maximum tolerance in error that is acceptable for a particular calculation based on a truncation scheme. Referring to operation 1010, the order set based on the threshold value that best satisfies $\Delta R$ is selected and those ordered pairs that fall below the threshold are removed from the set of diffraction orders.

Figure 11:
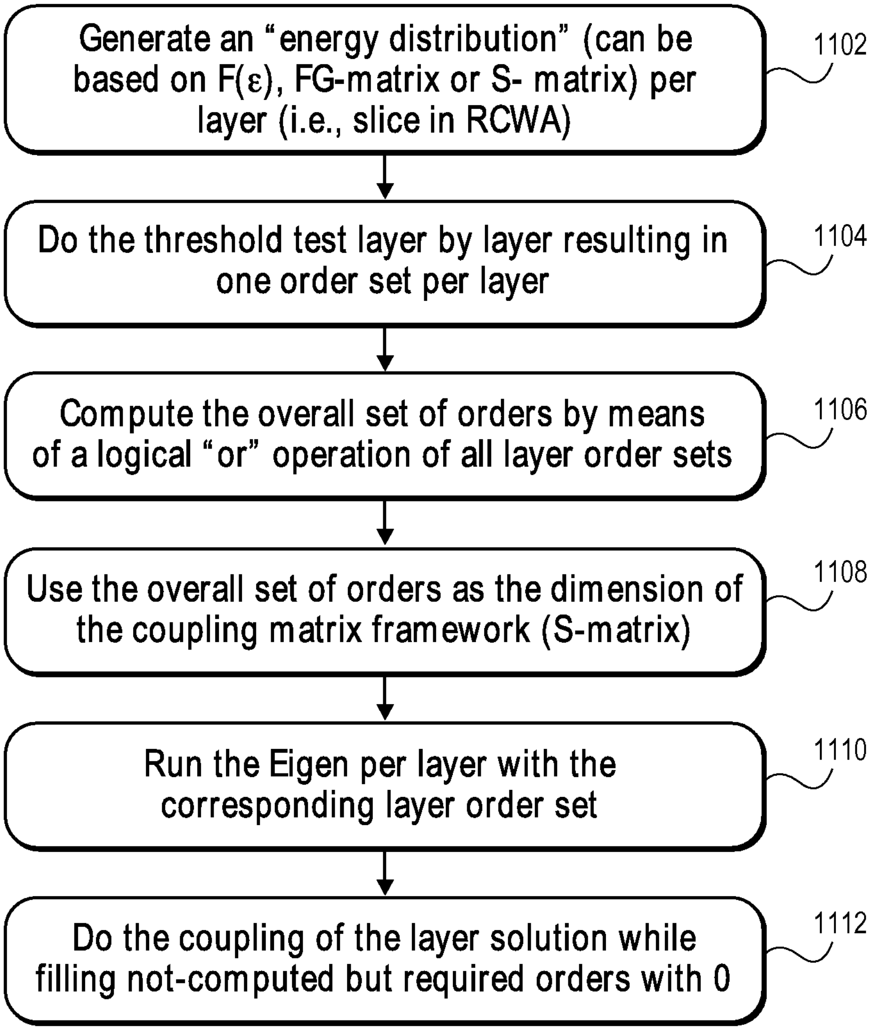
FIG. 11 depicts a Flowchart representing a series of operations in applying layer-by-layer truncation, in accordance with an embodiment of the present invention.

In another embodiment, truncating the set of diffraction orders includes retaining only the diffraction orders that fall within a preset threshold for a layer-by-layer solution. FIG. 11 depicts a Flowchart 1100 representing a series of operations in applying layer-by-layer truncation, in accordance with an embodiment of the present invention. Referring to operation 1102 of Flowchart 1100, an energy distribution for each layer is generated to prioritize a set of diffraction orders for each layer. In one embodiment, an energy distribution for a particular layer is generated as described above in association with operation 304 of Flowchart 300. Referring to operation 1104, the threshold test described in association with Flowchart 1000 is performed for each layer to provide one order set per layer. Referring to operations 1106 and 1108, respectively, the overall set of orders is computed by using a logical "or" of order sets for all layers and the overall set is used as the dimension of the coupling matrix framework. In a specific embodiment, the coupling matrix framework is an S-matrix. Referring to operation 1110, the Eigen is then run per layer with the corresponding layer set where the logical "or" of order sets for all layers determines the order set for the frame coupling schema. Referring to operation 1112, the coupling of the layer solution is performed by using a zeroed-out placeholder or other filling schemas for any orders that are deemed required but are not computed. Thus, a layer-by-layer (or slice-by-slice) threshold test provides one order set per layer and a computation is performed for all sets of orders.

Referring to operation 308 of Flowchart 300, a simulated spectrum is provided based on the truncated set of diffraction orders. In accordance with an embodiment of the present invention, by using a truncated set of diffraction orders is used for the computation, the computation cost for providing the simulated spectrum is lower relative to the cost for a computation based on a complete diffraction order set. Only a negligible amount of information for a three-dimensional structure is excluded from the computation because the truncated set was determined by selecting the optimal truncation approach. In one embodiment, the simulated spectrum obtained from the truncated set of diffraction orders is then compared to a sample spectrum. In a specific embodiment, the sample spectrum is collected from a structure such as, but not limited to, a physical reference sample or a physical production sample. In another specific embodiment, the sample spectrum is collected from a hypothetical structure for which a simulated spectrum is obtained by a method not involving diffraction order truncation. In that embodiment, the quality of the more efficient simulation based on a truncated diffraction set can be determined.

Figure 12A:
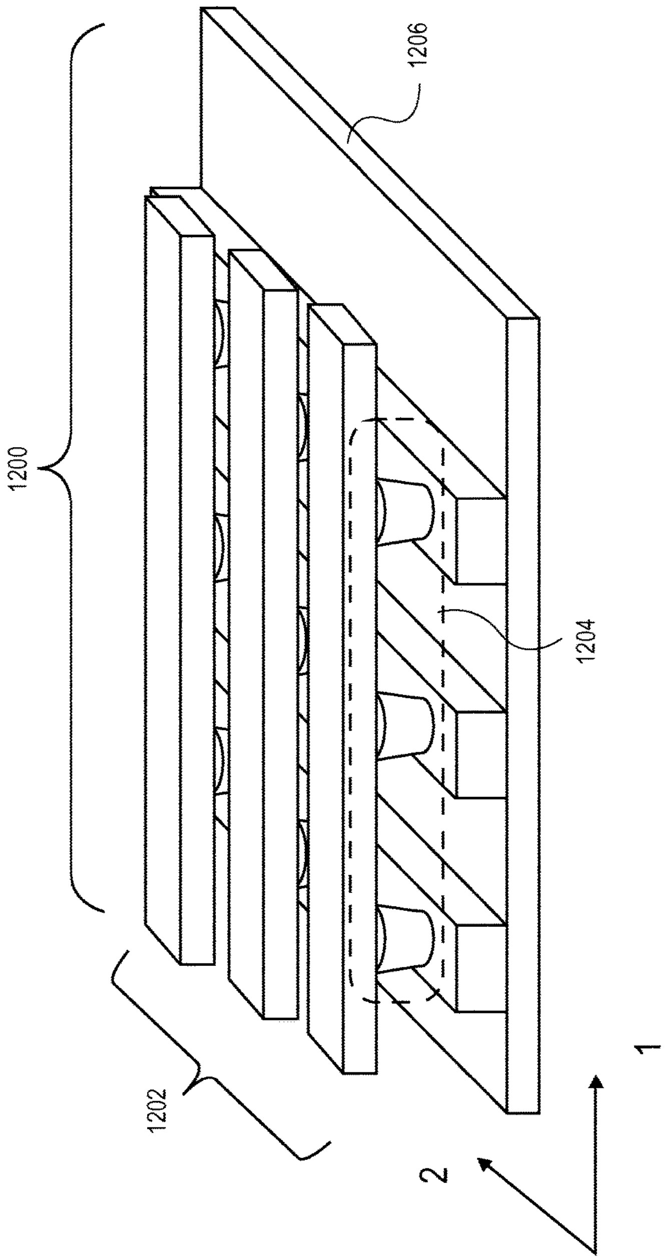
FIG. 12A represents a cross-sectional view of a structure having both a two-dimensional component and a three-dimensional component, in accordance with an embodiment of the present invention.

In another aspect of the present invention, a structure includes both a three-dimensional component and a two-dimensional component. The efficiency of a computation based on simulated diffraction data may be optimized by taking advantage of the simpler contribution by the two-dimensional component to the over all structure and the diffraction data thereof. This approach is an exemplary embodiment of the layer-by-layer approach described in association with FIG. 11. FIG. 12A represents a cross-sectional view of a structure having both a two-dimensional component and a three-dimensional component, in accordance with an embodiment of the present invention. Referring to FIG. 12A, a structure 1200 has a two-dimensional component 1202 and a three-dimensional component 1204 above a substrate 1206. The grating of the two-dimensional component runs along direction 2, while the grating of the three-dimensional component runs along both directions 1 and 2. In one embodiment, direction 1 is orthogonal to direction 2, as depicted in FIG. 12A. In another embodiment, direction 1 is non-orthogonal to direction 2.

A diffraction simulation may be performed based on a three-dimensional RCWA for all layers in a layered structure. However, such a simulation may be very time consuming due to the included diagonalization of the resulting differential equation system. Accordingly, in one embodiment, the particular properties of any two-dimensional layers present in a layered structure are exploited to speed up the diffraction simulation. For example, FIGS. 12B-12G represent equations for use in applying computation optimization to a simulated set of diffraction orders for a structure having both a two-dimensional component and a three-dimensional component, in accordance with an embodiment of the present invention. In an embodiment, the Eigenproblem for a three-dimensional structure is defined by the differential equation system (DES) provided in FIG. 12B. Referring to FIG. 12B, the DES is only the differential equation system of first order. From this system, a differential equation system of second order can be derived assuming that the refraction index does not change in normal direction (which is given within a slice or slab). Next, an Eigen equation system can be derived from this differential equation. By way of example, a standard Eigen problem can be written as shown in eq. 1

$$A\cdot x-\lambda\cdot x=0 \qquad \text{(eq. 1)}$$

In eq. 1, x corresponds to the Eigenvector, A is the so-called Eigen matrix of the problem and λ is the Eigen value. The Eigenvector becomes a matrix of Eigen vectors and the Eigen value inflates to a vector of Eigen values. Then, the F·G corresponds to the Eigen matrix A, $\mu k_0^2 \cos^2\xi\cdot\gamma^2$ corresponds to the vector of Eigen values, and $$\begin{pmatrix} E_1 \\ E_2 \end{pmatrix}$$

corresponds to the matrix of Eigen vectors. α and β are diagonal matrices with the diagonal elements formed by the wave vector components in direction 1 and 2 (or x and y for orthogonal systems). ξ is the non-orthogonal angle of the elementary cell. $[|\epsilon|]$ is the Toeplitz matrix formed by the Fourier elements of the index distribution. Similarly, $$\left[\left|\frac{1}{\varepsilon}\right|\right]$$

is formed by the inverse of the index distribution. Moreover, $[\lfloor\epsilon\rfloor]$ and $\lfloor\lceil\epsilon\rceil\rfloor$ are special Toeplitz matrices of the Fourier components of the index distribution. In addition, the single bracketed $[\epsilon]$ and $$\left[\frac{1}{\varepsilon}\right]$$

denote the Toeplitz matrices of the Fourier transform components for 1D line spaces. For a more detailed description of the Eigenproblem for a three-dimensional structure and its relationship to the equations in FIGS. 12B-12G, see Lifeng Li: "New formulation of the Fourier modal method for crossed surface-relief gratings," Journal of Optical Society of America A 14 (1997), pp. 2758-2767, which is incorporated herein by reference in its entirety.

The particular ϵ-matrices are defined by the equations provided in FIG. 12C. $P_1$ and $P_2$ are the grating periods in direction 1 and 2. The indices m, m', n and n' are the Fourier orders in direction 1 and 2. Depending on whether the lines of a particular layer run in direction 1 or 2, two cases for the simplification of these DESs have to be considered. In one embodiment, the lines are parallel to $X_2$. In this case, $\epsilon(x_1,x_2)=\epsilon(x_1)$ holds. This results in all $e_{m\ n,m'n'}=0$ for all elements with n≠n'. The specific ϵ-matrices simplify as shown in FIG. 12D. Accordingly, the orders in the DES can be separated for order groups with n=const. and the Eigenproblem can be "fractioned" into corresponding parts. The DES for these grouped orders simplifies as shown in FIG. 12E.

In another embodiment, the lines are parallel to $X_1$. In this case, $\epsilon(x_1,x_2)=\epsilon(x_2)$ holds. This results in all $e_{m\ n,m'n'}=0$ for all elements with m≠m'. Here, due to the fractioning of the total Eigen problem into smaller problems with m=m' or n=n', the index m or n denotes one of the smaller problems for the order m or n depending on whether the 2D lines run parallel to direction 1 or 2. Referring to FIG. 12E, $X^1$ and $X^2$ are the contra-variant lateral coordinates of the system. The imaginary number i is equal to $\sqrt{-1}$.

The specific ϵ-matrices simplify as shown in FIG. 12F. Accordingly, the orders in the DES can be separated for order groups with m=const. and the Eigenproblem can be "fractioned" into corresponding parts. The DES for these grouped orders simplifies as shown in FIG. 12G.

Thus, in accordance with an embodiment of the present invention, the general algorithm for a structure having both a three-dimensional component and a two-dimensional component is performed by 1) fractioning the full DES into groups, 2) solving the simplified DES for the particular two-dimensional layer for all groups (note that the Fourier transform of the ϵ-matrix has only to be done one time and can be used for all groups—the only difference in the DES from group to group is the $\alpha_m$ or $\beta_n$), 3) inserting the various group solutions (Eigenvectors/Eigenvalues) of the overall order assignment schema, and 4) computing the t-matrix and coupling to the S-matrix after the full Eigen is assembled from the groups.

In order to facilitate the description of embodiments of the present invention, an ellipsometric optical metrology system is used to illustrate the above concepts and principles. It is to be understood that the same concepts and principles apply equally to the other optical metrology systems, such as reflectometric systems. In a similar manner, a semiconductor wafer may be utilized to illustrate an application of the concept. Again, the methods and processes apply equally to other work pieces that have repeating structures.

Figure 13:
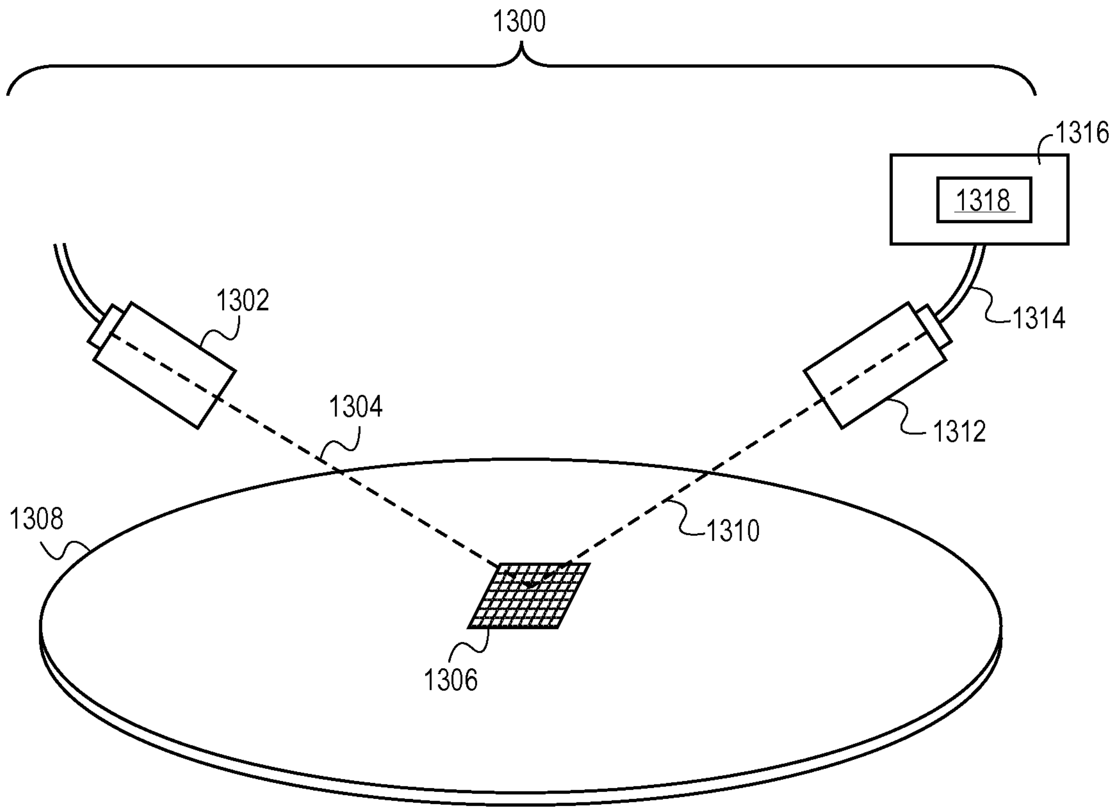
FIG. 13 is an architectural diagram illustrating the utilization of optical metrology to determine the profiles of structures on a semiconductor wafer, in accordance with an embodiment of the present invention.

FIG. 13 is an architectural diagram illustrating the utilization of optical metrology to determine the profiles of structures on a semiconductor wafer, in accordance with an embodiment of the present invention. The optical metrology system 1300 includes a metrology beam source 1302 projecting a metrology beam 1304 at the target structure 1306 of a wafer 1308. The metrology beam 1304 is projected at an incidence angle θ towards the target structure 1306. The diffraction beam 1310 is measured by a metrology beam receiver 1312. The diffraction beam data 1314 is transmitted to a profile application server 1316. The profile application server 1316 compares the measured diffraction beam data 1314 against a library 1318 of simulated diffraction beam data representing varying combinations of critical dimensions of the target structure and resolution.

In accordance with an embodiment of the present invention, at least a portion of the simulated diffraction beam data is based on a truncated set of diffraction orders. In one exemplary embodiment, the library 1318 instance best matching the measured diffraction beam data 1314 is selected. It is to be understood that although a library of diffraction spectra or signals and associated hypothetical profiles is frequently used to illustrate concepts and principles, the present invention applies equally to a data space comprising simulated diffraction signals and associated sets of profile parameters, such as in regression, neural network, and similar methods used for profile extraction. The hypothetical profile and associated critical dimensions of the selected library 1316 instance is assumed to correspond to the actual cross-sectional profile and critical dimensions of the features of the target structure 1306. The optical metrology system 1300 may utilize a reflectometer, an ellipsometer, or other optical metrology device to measure the diffraction beam or signal.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 14:
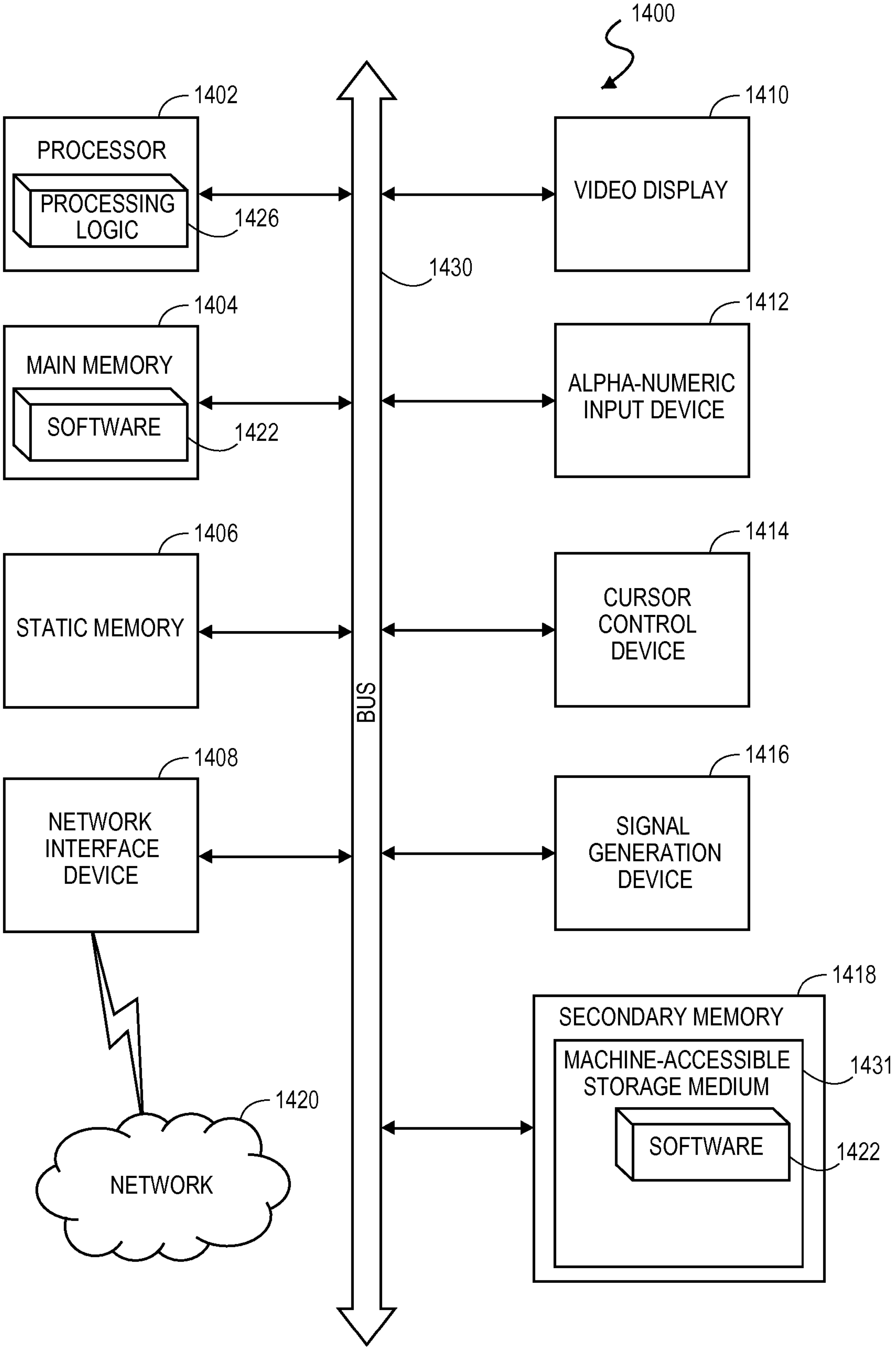
FIG. 14 illustrates a block diagram of an exemplary computer system, in accordance with an embodiment of the present invention.

FIG. 14 illustrates a diagrammatic representation of a machine in the exemplary form of a computer system 1400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processor 1402, a main memory 1404 (e.g., read-only memory (ROM), flash memory, dynamic random access memory (DRAM) such as synchronous DRAM (SDRAM) or Rambus DRAM (RDRAM), etc.), a static memory 1406 (e.g., flash memory, static random access memory (SRAM), etc.), and a secondary memory 1418 (e.g., a data storage device), which communicate with each other via a bus 1430.

Processor 1402 represents one or more general-purpose processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application specific integrated circuit (ASIC), a field programmable gate array (FPGA), a digital signal processor (DSP), network processor, or the like. Processor 1402 is configured to execute the processing logic 1426 for performing the operations and steps discussed herein.

The computer system 1400 may further include a network interface device 1408. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

The secondary memory 1418 may include a machine-accessible storage medium (or more specifically a computer-readable storage medium) 1431 on which is stored one or more sets of instructions (e.g., software 1422) embodying any one or more of the methodologies or functions described herein. The software 1422 may also reside, completely or at least partially, within the main memory 1404 and/or within the processor 1402 during execution thereof by the computer system 1400, the main memory 1404 and the processor 1402 also constituting machine-readable storage media. The software 1422 may further be transmitted or received over a network 1420 via the network interface device 1408.

While the machine-accessible storage medium 1431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method for improving computation efficiency for diffraction signals in optical metrology has been disclosed. In accordance with an embodiment of the present invention, a set of diffraction orders for a three-dimensional structure is determined. The diffraction orders within the set of diffraction orders are then prioritized. In one embodiment, the set of diffraction orders is truncated to provide a truncated set of diffraction orders based on the prioritizing. A simulated spectrum is then provided based on the truncated set of diffraction orders.

What is claimed is:

1. A method comprising:

simulating a diffraction signal for a certain three-dimensional structure using a processing unit of an optical metrology system, the diffraction signal being calculated from a set of diffraction orders;

prioritizing the diffraction orders, the set of diffraction orders representing a matrix of diffraction orders in a Fourier transformation, wherein a subset of the set of diffraction orders may be defined with a truncation schema having a basic schema shape;

for each of a plurality of truncation schemas, each truncation schema having a basic non-rectangular schema shape, determining a difference between a result generated by the truncation schema and a result generated by a rectangular schema;

comparing the difference for each of the plurality of truncation schemas to an error threshold;

selecting a truncation schema of the plurality of truncation schemas for the three-dimensional structure that provides a best result based at least in part on the comparison of the difference for each of the plurality of truncation schemas to the error threshold;

truncating the set of diffraction orders based on the selected truncation schema, wherein truncating the set of diffraction orders includes the processing unit retaining only diffraction orders presented in the matrix of diffraction orders that are within the selected truncation schema;

determining the simulated diffraction signal based on calculations using the truncated set of diffraction orders; and comparing the simulated diffraction signal to a diffraction signal measured from the three dimensional structure using an optical metrology tool.

2. The method of claim 1, wherein determining the difference between the result generated by each truncation schema and the result generated by a rectangular schema includes:

running an order convergence for the truncation schema and determining a convergence order for the truncation schema;

obtaining a reflectance result for the truncation schema based on the determined convergence order for the truncation schema; and determining a difference between the reflectance result for the truncation schema and a reflectance result for a rectangular schema.

3. The method of claim 1, wherein the error threshold represents a maximum tolerance in error that is acceptable for a particular calculation based on a truncation scheme.

4. The method of claim 3, wherein the maximum tolerance is a noise level from the optical metrology tool.

5. The method of claim 1, wherein each truncation schema of the plurality of truncation schemas represents a group of diffraction orders in the matrix of diffraction orders around a zeroth order of the diffraction orders.

6. The method of claim 1, wherein the basic schema shape is selected from the group consisting of a diamond, a circle, and a star.

7. The method of claim 6, wherein the basic schema shapes include a shape that is rotated in the matrix of diffraction orders.

8. The method of claim 1, wherein the optical metrology tool includes a reflectometer or ellipsometer.

9. An optical metrology system comprising:

a memory including storage for a library with a plurality of simulated diffraction signals and a plurality of values of one or more profile parameters associated with the plurality of simulated diffraction signals;

an optical metrology tool to measure a diffraction signal obtained from the three-dimensional structure; and a processing unit to generate the library, the processing unit to:

simulate a diffraction signal for a certain three-dimensional structure, the diffraction signal being calculated from a set of diffraction orders, prioritize the diffraction orders, the set of diffraction orders representing a matrix of diffraction orders in a Fourier transformation, wherein a subset of the set of diffraction orders may be defined with a truncation schema having a basic schema shape;

for each of a plurality of truncation schemas, each truncation schema having a basic non-rectangular schema shape, determine a difference between a result generated by the truncation schema and a result generated by a rectangular schema;

compare the difference for each of the plurality of truncation schemas to an error threshold;

select a truncation schema of the plurality of truncation schemas for the three-dimensional structure that provides a best result based at least in part on the comparison of the difference for each of the plurality of truncation schemas to the error threshold;

truncate the set of diffraction orders based on the selected truncation schema, wherein truncating the set of diffraction orders includes the processing unit to retain only diffraction orders presented in the matrix of diffraction orders that are within the selected truncation schema;

determine the simulated diffraction signal based on calculations using the truncated set of diffraction orders; and compare the simulated diffraction signal to a diffraction signal measured from the three-dimensional structure using the optical metrology tool.

10. The system of claim 9, wherein the optical metrology tool includes a reflectometer or ellipsometer.

11. The system of claim 9, wherein determining the difference between the result generated by each truncation schema and the result generated by a rectangular schema includes:

running an order convergence for the truncation schema and determining a convergence order for the truncation schema;

obtaining a reflectance result for the truncation schema based on the determined convergence order for the truncation schema; and determining a difference between the reflectance result for the truncation schema and a reflectance result for a rectangular schema.

12. The system of claim 9, wherein the error threshold represents a maximum tolerance in error that is acceptable for a particular calculation based on a truncation scheme.

13. The system of claim 12, wherein the maximum tolerance is a noise level from the optical metrology tool.

14. The system of claim 9, wherein each truncation schema represents a group of diffraction orders in the matrix of diffraction orders around a zeroth order of the diffraction orders.

15. The system of claim 9, wherein the basic schema shape is selected from the group consisting of a diamond, a circle, and a star.

16. The system of claim 15, wherein the basic schema shapes include a shape that is rotated in the matrix of diffraction orders.

17. A non-transitory computer-readable storage medium having stored thereon data representing sequences of instructions that, when executed by a processor, cause the processor to perform operations comprising:

simulating a diffraction signal for a certain three-dimensional structure, the diffraction signal being calculated from a set of diffraction orders;

prioritizing the diffraction orders, the set of diffraction orders representing a matrix of diffraction orders in a Fourier transformation, wherein a subset of the set of diffraction orders may be defined with a truncation schema having a basic schema shape;

for each of a plurality of truncation schemas, each truncation schema having a basic non-rectangular schema shape, determining a difference between a result generated by the truncation schema and a result generated by a rectangular schema;

comparing the difference for each of the plurality of truncation schemas to an error threshold;

selecting a truncation schema of the plurality of truncation schemas for the three-dimensional structure that provides a best result based at least in part on the comparison of the difference for each of the plurality of truncation schemas to the error threshold;

truncating the set of diffraction orders based on the selected truncation schema, wherein truncating the set of diffraction orders includes the processor retaining only diffraction orders presented in the matrix of diffraction orders that are within the selected truncation schema;

determining the simulated diffraction signal based on calculations using the truncated set of diffraction orders; and comparing the simulated diffraction signal to a diffraction signal measured from the three dimensional structure using an optical metrology tool.

18. The medium of claim 17, wherein determining the difference between the result generated by each truncation schema and the result generated by a rectangular schema includes:

running an order convergence for the truncation schema and determining a convergence order for the truncation schema;

obtaining a reflectance result for the truncation schema based on the determined convergence order for the truncation schema; and determining a difference between the reflectance result for the truncation schema and a reflectance result for a rectangular schema.

* * * * *